(No Model.)

T. B. OSBORNE.
MIDDLINGS PURIFIER.

No. 254,039. Patented Feb. 21, 1882.

Witnesses:
J. H. Shumway
Jos. C. Earle

Thomas B. Osborne
Inventor
By Atty.

United States Patent Office.

THOMAS B. OSBORNE, OF NEW HAVEN, CONNECTICUT.

MIDDLINGS-PURIFIER.

SPECIFICATION forming part of Letters Patent No. 254,039, dated February 21, 1882.

Application filed December 19, 1881. (No model.)

*To all whom it may concern:*

Be it known that I, THOMAS B. OSBORNE, of New Haven, in the county of New Haven and State of Connecticut, have invented a new Improvement in Middlings-Purifiers; and I do hereby declare the following, when taken in connection with the accompanying drawings and the letters of reference marked thereon, to be a full, clear, and exact description of the same, and which said drawings constitute part of this specification, and represent, in—

Figure 1:
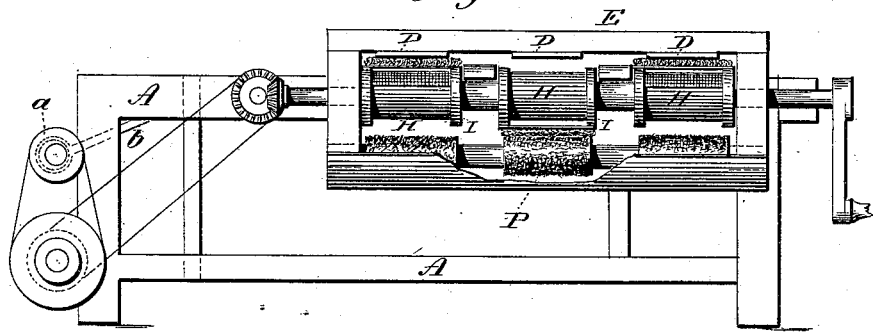
Figure 2:
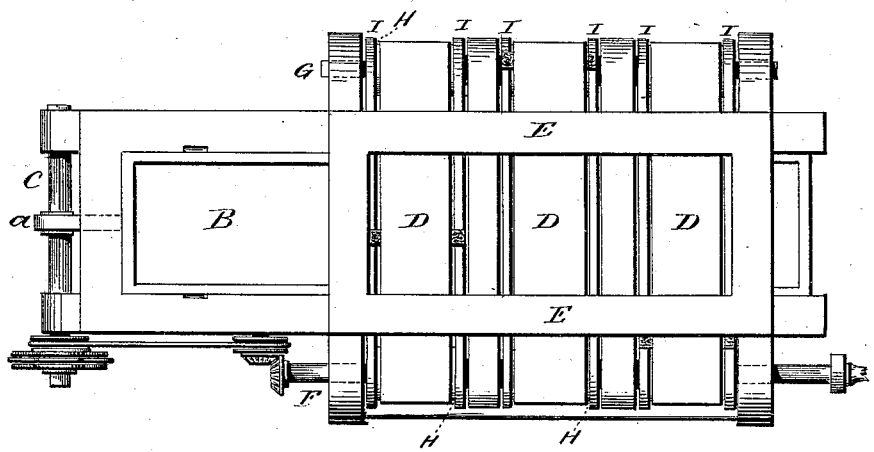
Figure 3:
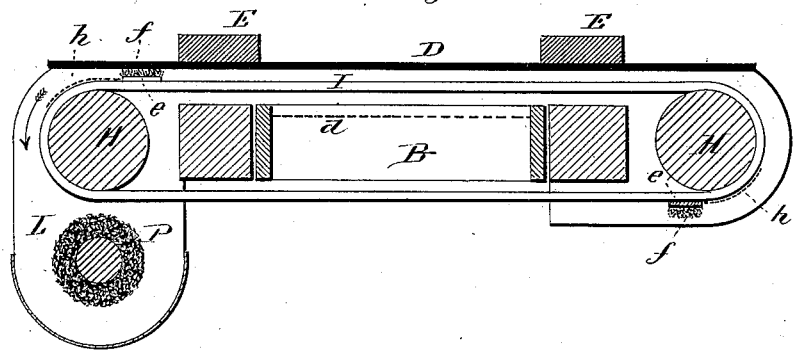

Figure 1, a side view, the parts broken away; Fig. 2, a top view; Fig. 3, a transverse section through one of the electrified plates.

This invention relates to an improvement in apparatus for separating the lighter particles from ground or broken wheat or other grain or material, and which depreciate the quality of the flour if permitted to remain, such apparatus being commonly known as "middlings-purifiers."

My present invention employs the principal features of the invention for which Letters Patent were granted to me dated February 17, 1880, No. 224,719. In that patent I employed rolls arranged and presenting an electrified surface over the material to be operated upon, which moves in an agitated state beneath the revolving rolls, so that the lighter particles are attracted to the electrified surface of the rolls, and by the movement of the rolls are taken away and stripped from the belt.

My invention consists in the combination and arrangement of mechanism hereinafter described, and more particularly recited in the claims.

A is the frame on which the mechanism is arranged. Longitudinally in the frame a receiver, B, is arranged in suitable guides, and to which a rapid short reciprocating movement is imparted by means of an eccentric, a, on the driving-shaft C through a pitman, b, so that the ground material placed on the sieve-cloth d, or bottom of the receiver, will be shaken or agitated as it passes along over its surface.

Over the receiver and transversely across it one or more plates, D, are secured to a frame, E, so as to remain stationary. They are constructed so as to present upon their under side an electrified surface, preferably of hard rubber, and are arranged with that electrified surface substantially parallel with the surface of the receiver, so that the ground material, passing along the receiver, comes into close proximity to the electrified surface of the plates D, and so that the lighter particles will be attracted to the plates. To remove the particles so attracted to the plates, a longitudinal shaft, F, is arranged on the sides of the machine, and which is caused to revolve by the application of power thereto, as shown, or otherwise, and on the opposite side is a second shaft, G, parallel to the shaft F. On these shafts are pulleys H H, one each side of each of the plates, and over these pulleys are endless bands I, the upper run of the bands being slightly below the line of the under surface of the plates, but parallel therewith. Beneath the plates and connecting the bands I I are cross-bars e, more or less in number, which travel with the bands and pass beneath the surface of the plates. These bars carry a brush, f, of a woolly character, which runs in contact with the surface of the plates to electrify that surface. At the same time they brush from that surface the particles which may have been attracted thereon. In front of each of the brushes is an apron, h, onto which the particles so brushed will fall, and by which they will be carried along until the band turns over the pulley, when the particles will fall into a receptacle, L, below.

The number of plates employed is immaterial; but less in number will be required than when rolls are used, as in my previous patent, because a roll, say, four-inches in diameter presents but a fraction of its surface for action upon the material, whereas a plate four inches wide, which would occupy the same space as the four-inch roll, will present its full width for active surface.

The plates may be made adjustable with relation to the surface of the receiver, or receivers adjustable with relation to the plates, so as to present greater or less distance between the two, as occasion may require.

While I prefer to employ the brushes, which serve to electrify the surface of the plates, as strippers to remove the particles, an independent stripper may be employed slightly in advance of the brushes, it only being essential that there shall be some device moving parallel with the surface of the plate, which will strip therefrom the particles attracted to the plate.

Brushes P, revolving or stationary, may be arranged at or near the receptacle, to remove from the brushes $f$ or the strippers the particles which may adhere thereto.

It will be understood that I do not broadly claim passing the ground material in a state of agitation beneath a movable electrified surface, for the reason that that is secured to me in my previous patent; but What I do claim is—

1. The combination of a receiver for the ground material, arranged and operating to agitate the ground material passing thereon, with one or more stationary electrified surfaces above the surface of the ground material passing in the receiver, substantially as described.

2. The combination of a receiver for the ground material, arranged and operating to agitate the ground material passing thereon, with one or more stationary electrified surfaces above the surface of the ground material passing in the receiver, and a brush or brushes, $e$, arranged to travel on the working-surface of said plates between that surface and the ground material, substantially as and for the purpose described.

3. The combination of a receiver for the ground material, arranged and operating to agitate the ground material passing thereon, with one or more stationary electrified surfaces above the surface of the ground material passing in the receiver, with a stripper or strippers arranged to travel between the surfaces of the ground material and the electrified surface of the plates to take from the surface of the plates the particles attracted thereto and carry them to a receptacle, substantially as described.

THOMAS B. OSBORNE.

Witnesses:
 HENRY S. DURAND,
 JOS. C. EARLE.